US012025204B2

(12) United States Patent
Ewers et al.

(10) Patent No.: US 12,025,204 B2
(45) Date of Patent: Jul. 2, 2024

(54) VALVE ARRANGEMENT FOR A SHOCK ABSORBER COMPRISING A TRIPLE SPRING ARRANGEMENT

(71) Applicant: ÖHLINS RACING AB, Upplands Väsby (SE)

(72) Inventors: Benny Ewers, Upplands Vasby (SE); Fredrik Larsson, Jönköping (SE); Arnold Hoven, Upplands Väsby (SE)

(73) Assignee: DRiV Automotive Inc., Northville, MI (US)

( * ) Notice: Subject to any disclaimer, the term of this patent is extended or adjusted under 35 U.S.C. 154(b) by 168 days.

(21) Appl. No.: 17/508,884

(22) Filed: Oct. 22, 2021

(65) Prior Publication Data
US 2022/0128116 A1    Apr. 28, 2022

(30) Foreign Application Priority Data
Oct. 23, 2020   (EP) ..................... 20203600

(51) Int. Cl.
*F16F 9/46*    (2006.01)
*F16F 9/348*   (2006.01)

(52) U.S. Cl.
CPC ........... *F16F 9/464* (2013.01); *F16F 9/3485* (2013.01); *F16F 9/465* (2013.01); *F16F 2230/24* (2013.01)

(58) Field of Classification Search
CPC ............. F16F 9/464; F16F 9/3485; F16F 9/48
See application file for complete search history.

(56) References Cited

U.S. PATENT DOCUMENTS 2,656,434 A * 10/1953 Jochem ............... H01H 71/44
                                                    188/300
2012/0097493 A1* 4/2012 Ewers ................. F16F 9/3405
                                                    188/322.13

FOREIGN PATENT DOCUMENTS

| CN | 102076988 A * | 5/2011 | ............... F16F 9/34 |
| CN | 109826840 A | 5/2019 | |
| DE | 10312977 A1 | 10/2004 | |
| DE | 102006016473 A1 | 6/2007 | |

(Continued)

OTHER PUBLICATIONS

EPO Extended European Search Report dated Apr. 8, 2021 regarding Application No. 20203600.0 (7 pages).

*Primary Examiner* — Melody M Burch
(74) *Attorney, Agent, or Firm* — DRiV Automotive Inc.

(57) ABSTRACT

The present disclosure relates to a valve arrangement for a shock absorber. The valve arrangement comprises a valve member axially moveable relative a housing, and a triple spring arrangement including a first spring, a second spring and a coil spring arranged between the valve member and a coupling member coupled to the first spring and the second spring. The valve arrangement is adapted so that when the valve member moves no more than a first stroke length relative a predetermined reference position the first spring deflects to adjust a force equilibrium of the valve member, when the valve member moves more than the first stroke length the second spring deflects to adjust said force equilibrium, and when the valve member moves beyond a second stroke length greater than the first stroke length, the coil spring compresses to adjust said force equilibrium. A shock absorber comprising such a valve arrangement and a method for controlling a damping medium flow in a shock absorber is disclosed as well.

14 Claims, 10 Drawing Sheets

(56) References Cited

FOREIGN PATENT DOCUMENTS

EP 2201262 4/2009
EP 2206901 A1 7/2010

\* cited by examiner

VALVE ARRANGEMENT FOR A SHOCK ABSORBER COMPRISING A TRIPLE SPRING ARRANGEMENT

CROSS-REFERENCE TO RELATED APPLICATION

This application claims priority to European Application No. EP20203600, filed Oct. 23, 2020, which application is hereby incorporated herein by reference in its entirety.

TECHNICAL FIELD

The disclosure relates to a valve arrangement for a shock absorber for regulating a damping medium flow between the damping chambers of the shock absorber, and in particular to a valve arrangement comprising a triple spring arrangement, capable of enabling desired damping force characteristics.

BACKGROUND

Spring arrangements consisting of a weak and a stiff spring, in which the weak spring biases the stiff spring and contributes to different spring qualities in different parts of the stroke, are used in many technical constructions, such as, for example, in valves intended to control the damping medium flow in a shock absorber. Especially in shock absorber applications in which the valves must have a precise damping pressure level without adjustable arrangement, a low spring constant right at the start of the stroke is important. The low spring constant then passes into a higher spring constant, which is matched to the high pressures which can be generated in the shock absorber under rapid motions.

A known design within the technical field of the disclosure is described in EP 2201262 A1.

SUMMARY

It is desired to improve upon known designs so that desired damping force characteristics can be achieved. However, some known designs have difficulty in providing reliable solutions, in part due to lackluster tolerances of springs intended to be used. Some solutions also provide solutions that take up considerable space of the limited space in a shock absorber. Some solutions provide solutions that provide acceptable damping force characteristics in certain stroke length intervals while sacrificing the quality of damping force characteristics in other stroke length intervals.

Thus, there is a need for an improved valve arrangement for a shock absorber which alleviates at least some of these issues.

It is an object of the present disclosure to provide an improved solution that alleviates the mentioned drawbacks with present solutions. Furthermore, it is an object to provide a valve arrangement for a shock absorber which is able to provide desired damping force characteristics. Here, desired damping force characteristics may include: a first damping force region with respect to a first stroke length interval wherein the damping force increases slowly, a second damping force region with respect to a subsequent second stroke length interval wherein the damping force increases rapidly, and a third damping force region with respect to a further subsequent third stroke length interval wherein the damping force increases more slowly. Moreover, it is an object to provide a shock absorber incorporating such a valve arrangement and it is also an object to provide a corresponding method for controlling a damping medium flow between damping chambers of a shock absorber.

The disclosure includes incorporating a triple spring arrangement of a certain design in a valve arrangement. The triple spring arrangement comprises a coil spring, a first spring and a second spring which are each adapted to deform so as to adjust a force equilibrium of a valve member during different stroke length intervals corresponding to the different damping force regions mentioned above. The disclosure further aims to provide a valve arrangement comprising a spring arrangement which is compact and simple and cheap to fit, produce and adjust.

According to a first aspect of the disclosure, a valve arrangement for a shock absorber is provided. The valve arrangement comprises a valve member axially moveable relative a housing by which movement an opening defined by an interface between the valve member and a valve seat is adjusted. The valve arrangement comprises a spring arrangement. The spring arrangement comprises a first spring, a second spring and a coil spring arranged between the valve member and a coupling member coupled to the first spring and the second spring. The valve arrangement is adapted so that, when arranged in a shock absorber, a damping medium flow between the damping chambers of the shock absorber is regulated by the force equilibrium of the valve member, which force equilibrium is partially or mainly created by a damping medium pressure which is dependent on the damping medium flow and acts upon the valve member counter to the action of the spring arrangement. The valve arrangement is further adapted so that, when the valve member moves no more than a first stroke length relative a predetermined reference position, the first spring deflects to adjust said force equilibrium, when the valve member moves more than the first stroke length, the second spring deflects to adjust said force equilibrium, and when the valve member moves beyond a second stroke length greater than the first stroke length, the coil spring compresses to adjust said force equilibrium.

Hereby, when the valve arrangement is arranged accordingly in a shock absorber, the damping force characteristics of a shock absorber is characterized in terms of, at successively increasing stroke lengths: a first region corresponding to the first stroke length of a slowly increasing damping force; a second region corresponding to the second stroke length of rapidly increasing damping force; a third region of slowly increasing damping force corresponding to a third stroke length greater than the second stroke length, which third stroke length is defined by the remaining stoke length the valve member is able to move until prevented from moving further into the housing.

More particularly, this desired damping force characteristics is achieved at least partly due to the spring arrangement comprising the first spring, the second spring and the coil spring, i.e. the triple spring arrangement, and how it is adapted to interact with the valve member as it moves relative the housing.

As mentioned above, the valve member is adapted to engage with a valve seat. The valve seat may be a separate part to the housing. Further, the valve seat and the valve member may be adapted in shape and form to define a recess at their interface for distributing the damping medium over a greater region at the interface. This may facilitate moving the valve member relative the housing and away from the valve seat in a controlled manner. The valve member may comprise a through-hole aligned axially with the valve member adapted to allow damping medium flow therethrough without needing to force the valve member to be displaced relative the valve seat.

The valve arrangement is as mentioned above intended so as to regulate a damping medium flow between damping chambers of a shock absorber. The damping chambers may refer to a compression chamber and a rebound chamber. Further, damping medium may flow through the opening defined by the interface between the valve member and the valve seat, which thereby alleviates increased pressure build-up to a degree. In other words, the position of the valve member relative the valve seat may regulate the damping medium flow.

The coupling member may be adapted to facilitate the coil spring to couple with the first spring and the second spring. The coupling member may be adapted and mounted so that the first spring deflects before the second spring in response to damping medium flow and/or movement of the valve member. The coupling member may represent a member of the triple spring arrangement, i.e. the spring arrangement may comprise the coupling member. The coupling member may be adapted to couple with the valve member so as to maintain the coil spring in place.

As mentioned, the first, second and third stroke lengths are measured relative a predetermined reference position of the housing. By predetermined reference position, it is meant a position in the housing which is fixed, at least during use. The stroke length of the valve member is then measured as the distance along the stroke path of the valve member in the housing the valve member moves relative said fixed position.

In the context of the application, the expressions "slowly" and "rapidly" used in association with the damping force in the different damping force regions should be understood as merely indicating the relation of damping force behavior of different damping force regions, i.e. the second damping force region is characterized by a more rapidly increasing damping force with respect to stroke length as compared to the damping forces of the first and third damping force region. Likewise, the first and third damping force regions are characterized by a more slowly increasing damping force with respect to stroke length as compared to the damping force of the second damping force region.

In the context of the application, "a pressure responsive valve" should be understood as a valve adapted to enable a larger flow-through opening in response to a change in pressure. It may refer to a valve adapted to enable a larger flow-through opening in response to an increase in pressure. Further, it may mean a valve adapted to be actuated, in response to a change in pressure, from a closed state to an open state. Examples of pressure responsive valves may include shim stacks, poppet valves etc.

In the context of the application, low-, intermediate- and high stroke speeds may be primarily regarded as stroke speeds in the intervals of 0-1 m/s, 1-2 m/s and 2-4 m/s, respectively. Further stroke speeds of more than 4 m/s may be regarded as included in the high stroke speed interval.

In the context of the application, "arranged in series" should be understood as an object A and an object B being arranged such that they are fluidly coupled to each other. The wording "fluidly coupled" should be understood as an object A being coupled to an object B by any coupling means such as a channel, pipe, hose or other connection means through which a damping medium may flow. The coupling may be direct coupling, or it may be indirect coupling. Also, in the context of the application, an object A being "fluidly arranged between" objects B and C should be understood as that the placing of object A is between object B and object C, in the fluid path running between objects B and C. Thus, object A does not need to be "fluidly arranged" as in floating.

In the context of the application, "open state" should be understood as an object A being configured to allow damping medium to flow through it. Also, "closed state" should be understood as an object A being configured to prevent a damping medium to flow through it.

In the context of the application, "compression stroke" should be understood as the movement of the piston head when it moves towards the compression chamber. Also, "rebound stroke" should be understood as the movement of the piston head when it moves towards the rebound chamber.

In the context of the application, the expression "coupled to/with" should be understood as an object A being mechanically connected to an object B in some manner, not necessarily directly mechanically connected—there may for instance be an object C connecting object A with object B. Likewise, the expression "arranged between" etc. should be understood as not limiting to the case wherein an object C is directly arranged in-between an object A and an object B, there may be other objects D, E, etc. directly in-between objects C and A and/or B.

According to one example, the second spring has a higher spring constant than the first spring and the coil spring. This may constitute one way of ensuring that the first spring deflects prior to the second spring upon when the valve member moves axially towards higher stroke positions. An advantage of this is that it allows for a reliable and passive way of enabling the triple spring arrangement to function as desired. The higher spring constant may be achieved due to a difference in material and/or shape of the second spring relative the first spring. For instance, the second spring may be characterized in terms of dimensions which are thicker, wider or shorter as compared to the first spring.

According to one further example, the coil spring is biased when the valve member is at a resting stroke position relative the predetermined reference position. By resting stroke position, it may be meant when the valve member engages with the valve seat, i.e. rests thereto. The coil spring may be biased between the coupling member and the valve member. The coil spring may be biased such that it starts to compress only after the first and second spring have already deflected upon when the valve member moves axially towards higher stroke positions. Further, the coil spring may be characterized in terms of a spring constant which is lower than the second spring. This may represent one specific way of achieving the desired the damping force characteristics. In addition, the spring constant of the coil spring may be equal to, higher than or lower than the spring constant of the first spring. The relationship and magnitude of difference may be adjusted so as to achieve specific damping force characteristics in the first damping force region and the third damping force region. The resting stroke position may be a position axially offset relative the predetermined reference position.

According to one example, the coupling member is a spring cap adapted with latches for maintaining the biasing of the coil spring while allowing the coil spring to be compressed in a controlled manner. Each respective latch may be arranged on a respective leg of the spring cap. Each respective leg may be flexible so that the latches may be displaced towards each other when inserted into the valve member, and when inserted, the latches engage with the valve member, thereby maintaining the coil spring in a biased state. The length of the legs may determine how much the coil spring is biased when the valve member is at the resting stroke position. The spring cap may comprise two, three, four, five or more latches, each arranged on a respective leg. In a preferred example, the spring cap comprises three latches.

According to one example, the predetermined resting stroke position is adjustable by inserting an adjustment shim of a preferred thickness between the valve seat and the valve housing. By this, it is possible to adjust whether the first spring will be biased when the valve member is at the resting stroke position and how much the first spring will be biased, which consequently enables the damping force characteristic to be adjusted to a desired characteristic. The valve seat may be adapted with a protrusion for engaging with the adjustment shim. The width of the adjustment shim then determines how much the valve seat will be offset from the housing, which in turn also adjusts how much the valve member will be adjusted in terms of position when in the resting stroke position. When assembling the valve arrangement into a shock absorber, the valve seat will be offset relative the housing by an offset distance corresponding to the thickness of the adjustment shim. Advantageously, the valve arrangement may be adapted to be configured with one or more of a set of adjustment shims, which then may be selected so that a particular offset distance and thereby a desired biasing of the first spring is achieved. The valve arrangement may be configured with a plurality of such adjustment shims so that a desired biasing of the first spring is achieved. The set of adjustment shims may include adjustment shims having a thickness of up to 1 mm.

According to one example, both the first spring and the second spring are provided by deflectable shim spring portions of a single shim spring. By this, the triple spring arrangement may be provided in a more compact form factor. The shim spring may be a circular shim spring.

According to one example, the first spring is provided by an outer shim spring portion forming the outer rim of the shim spring, and an inner shim spring portion separated from the outer shim spring portion and connected thereto via flexible legs, so that the outer shim spring portion and the inner shim spring portion can deflect in relation to each other by a first deflection distance corresponding to the first stroke length. The second spring is provided by the inner shim spring portion and an innermost shim spring portion separated from the inner shim spring portion but connected thereto via flexible legs, so that the inner shim spring portion and the innermost shim spring portion can deflect in relation to each other by a second deflection distance corresponding to the second stroke length. By this design, the first and second spring occupy less space in an axial direction. Further, such a design results in a beneficial synergy with the coil spring which can be dimensioned accordingly in terms of spring constant and biasing so that the intended functionality is achieved.

According to one example, the coupling member is a spring cap comprising a protrusion adapted to press onto the innermost shim spring portion. The spring cap may comprise a main body and a protrusion extending in an axial direction out of said main body. The protrusion may be adapted to engage with one of the first and second spring which then may facilitate coupling thereto. Further, the main body may be adapted to engage with the first or second spring in a limiting manner, i.e. how much the protrusion protrudes out of the main body in the axial direction may determine how much the first or the second spring is able to deflect. In other words, it may determine the length of the first or second stroke length.

According to one example, the deflection distance between the outer shim spring portion and the inner shim spring portion is created by the first spring being biased between a first fixed part in the valve housing and the coil spring. Thus, the first spring may deflect in a reliable and controlled manner. Moreover, the deflection of the first spring may be limited, meaning the first spring will not contribute to the damping force characteristics in the second damping force region or the third damping force region.

According to one example, the deflection distance between the inner shim spring portion and the innermost shim spring portion is created by the second spring being biased between a second fixed part in the valve housing and the coupling member. In particular, the coupling member may, when it is a spring cap, couple with the innermost shim spring portion via the protrusion mentioned previously. The deflection distance between the inner shim spring portion and the innermost shim spring portion may be determined by how much the protrusion protrudes out of the main body of the spring cap. This provides a reliable way of ensuring that the deflection distance of the second spring is indeed limited and does not affect the damping force characteristics in the third damping force region.

According to one example, the legs connecting the innermost shim spring portion to the inner shim spring portion extend in a radial direction from a center of the shim spring. The legs may be symmetrically placed between the inner shim spring portion and the innermost shim spring portion. The thickness, width and length may be formed accordingly so as to achieve a desired spring constant.

According to one example, the legs connecting the inner shim spring portion with the outer shim spring portion extend in a circumferential direction of the shim spring. The legs may be symmetrically placed between the outer shim spring portion and the inner shim spring portion. The thickness, width and length may be formed accordingly so as to achieve a desired spring constant.

According to one example, either or both the first stroke length and the second stroke length is less than 2 mm, preferably less than 1 mm. By having smaller stroke lengths, the valve arrangement may be made in a more compact form factor.

According to one example, the valve arrangement may be adapted to be arranged in a shock absorber comprising a pilot valve. The pilot valve may comprise one or more pilot valve members adapted to be axially displaceable relative a pilot valve seat. The one or more pilot valve members may be adapted to be axially displaceable by a solenoid device configured to be able to generate a solenoid force acting on the one or more pilot valve member. The solenoid device may comprise an actuation member adapted to be moveable under influence of the solenoid device in an axial direction to or from the one or more pilot valve members. The solenoid force is then generated by the solenoid device forcing the actuation member to move toward and interact with the one or more pilot valve members. The pilot valve may comprise a pilot valve spring arranged to counteract the solenoid force acting on the pilot valve member. The pilot valve spring may be arranged to interact with the one or more pilot valve members in a direction counteracting the solenoid force. The pilot valve spring may constitute a part of the one or more pilot valve members. The pilot valve spring may be a shim spring adapted to be moveable between a first position where it is interacting with the pilot valve seat and a second position where it is positioned away from the pilot valve seat. The actuation member may be adapted to interact with the shim spring so that the shim spring flexes into the first position. When the shim spring is in the second position, the actuation member may be in a position where it does not interact with the shim spring or be in a position where it is in contact with the shim spring but not causing any further flexing of the shim spring. The shim spring may regulate the damping medium flow differently when in the first position and the second position. The solenoid force may be adjustable by adjusting the solenoid device.

The pilot valve may be adapted for fail-safe operation, i.e. a safe mode of operation when the solenoid force disappears, possibly unintentionally. The pilot valve spring may push the pilot valve member into a position where damping fluid can flow past the pilot valve member. In case the pilot valve spring constitutes a part of the one or more pilot valve members and, the shim spring may move to a less flexed position. The pilot valve may define a first damping medium flow path and a second medium flow path. When the solenoid device operates normally, the pilot valve may regulate the damping medium flow along the first damping medium flow path. In particular, the damping medium flow may be regulated along the first damping medium flow path by means of the shim spring. Further, the magnitude of the solenoid force may correlate to how much the damping medium flow is regulated. During fail-safe operation, i.e. when the solenoid force is not present or insufficient to counteract the pilot valve spring, the first damping medium flow path may close so that a majority of, or all of, the damping medium flows along the second damping medium flow path. The pilot valve may be adapted to, during fail-safe operation, regulate the damping medium flow along the second damping medium flow path. The pilot valve may be adapted to do this by means of a fail-safe shim. The failsafe shim may be in a biased state under fail-safe operation. In the case the pilot valve spring constitutes a part of the one or more pilot valve members and is a shim spring, the first damping medium flow path may, during fail-safe operation, be closed by the shim spring. The first damping fluid flow path may be partly defined by one or more channels extending through the pilot valve body.

The pilot valve spring may be a shim spring, for instance a coil spring. According to a preferred example, the pilot valve spring may be a shim spring. The pilot valve spring may be adapted to provide a different spring force by means of deflecting different spring portions depending on the position of the pilot valve member. The different spring portions may be adapted to abut interior portions of the pilot valve. According to one example, the pilot valve spring defines a first shim spring and a second shim spring which are interconnected. The first shim spring may be defined by a first shim spring portion corresponding to an outer rim of the shim spring and a second shim spring portion corresponding to an inner portion connected via flexible legs to the first shim spring portion. The second shim spring may be defined by the second shim spring portion corresponding to the inner portion and a third shim spring portion corresponding to an innermost shim spring portion connected via flexible legs to the inner portion. The flexible legs connecting the first shim spring portion and the second shim spring portion may be two, three, four, five or more. The flexible legs connecting the second shim spring portion to the third shim spring portion may be two, three, four, five or more. The first shim spring may be characterized by a different spring constant than the second shim spring. The first shim spring may be characterized by a larger spring constant than the second shim spring's spring constant. The first shim spring may be characterized by a smaller spring constant than the second shim spring's spring constant. The flexible legs connecting the first and second shim spring portion may extend in a circumferential direction. By "extend in a circumferential direction" it may mean that the flexible legs extend a distance from one point of a first shim spring portion to one point of a second shim spring portion offset in the circumferential direction relative the one point of said a first shim spring portion and a center point of the shim spring. The circumferential offset may be between 10-90 degrees. The flexible legs connecting the second and third shim spring portion may also extend in a circumferential direction. The circumferential offset between corresponding points may be between 10-90 degrees.

According to one example, the valve arrangement is adapted to operate under the influence of a pilot valve controlled by a solenoid device. The solenoid device may be controlled to adjust pressure affecting the operation of the valve arrangement. The solenoid device may adjust a pilot valve. The valve arrangement may be in fluid connection with the pilot valve. Damping medium flow may flow via the valve arrangement into the pilot valve. The pilot valve may be adapted to provide a first damping medium flow path and a second damping medium flow path. During normal operation, the damping medium flow may be regulated by the pilot valve along the first damping medium flow path. During fail-safe operation, i.e. when the solenoid device no longer provides a solenoid force or at least a solenoid force of sufficient magnitude, the pilot valve may regulate the damping medium flow along the second damping medium flow path. The first and second damping medium flow paths may constitute parallel damping medium flow paths.

According to a second aspect of the disclosure, a shock absorber is provided. The shock absorber comprises a valve arrangement according to the first aspect of the disclosure, or any of the examples thereof. By having the valve arrangement in the shock absorber, the shock absorber may thus operate in a desirable manner. For instance, the shock absorber may be characterized by a desired damping force characteristic previously mentioned.

According to a third aspect of the disclosure, a method for controlling a damping medium flow between damping chambers of a shock absorber is provided. This is done by means of a valve arrangement comprising a valve member axially moveable relative a housing by which movement an opening defined by an interface between the valve member and a valve seat is adjusted, and a spring arrangement comprising a first spring, a second spring and a coil spring arranged between the valve member and a coupling member coupled to the first spring and the second spring, wherein a damping medium flow between the damping chambers of the shock absorber is regulated by the force equilibrium of the valve member, which force equilibrium is partially or mainly created by a damping medium pressure which is dependent on the damping medium flow and acts upon the valve member counter to the action of the spring arrangement. The method comprises the steps of: when the valve member moves no more than a first stroke length relative a predetermined reference position, adjust said force equilibrium by deflecting the first spring; when the valve member moves more than the first stroke length, adjust said force equilibrium by deflecting the second spring, and when the valve member moves beyond a second stroke length greater than the first stroke length, adjust said force equilibrium by compressing the coil spring.

BRIEF DESCRIPTION OF THE DRAWINGS

The disclosure will in the following be described in more detail with reference to the enclosed drawings, wherein.

DETAILED DESCRIPTION

Figure 1:
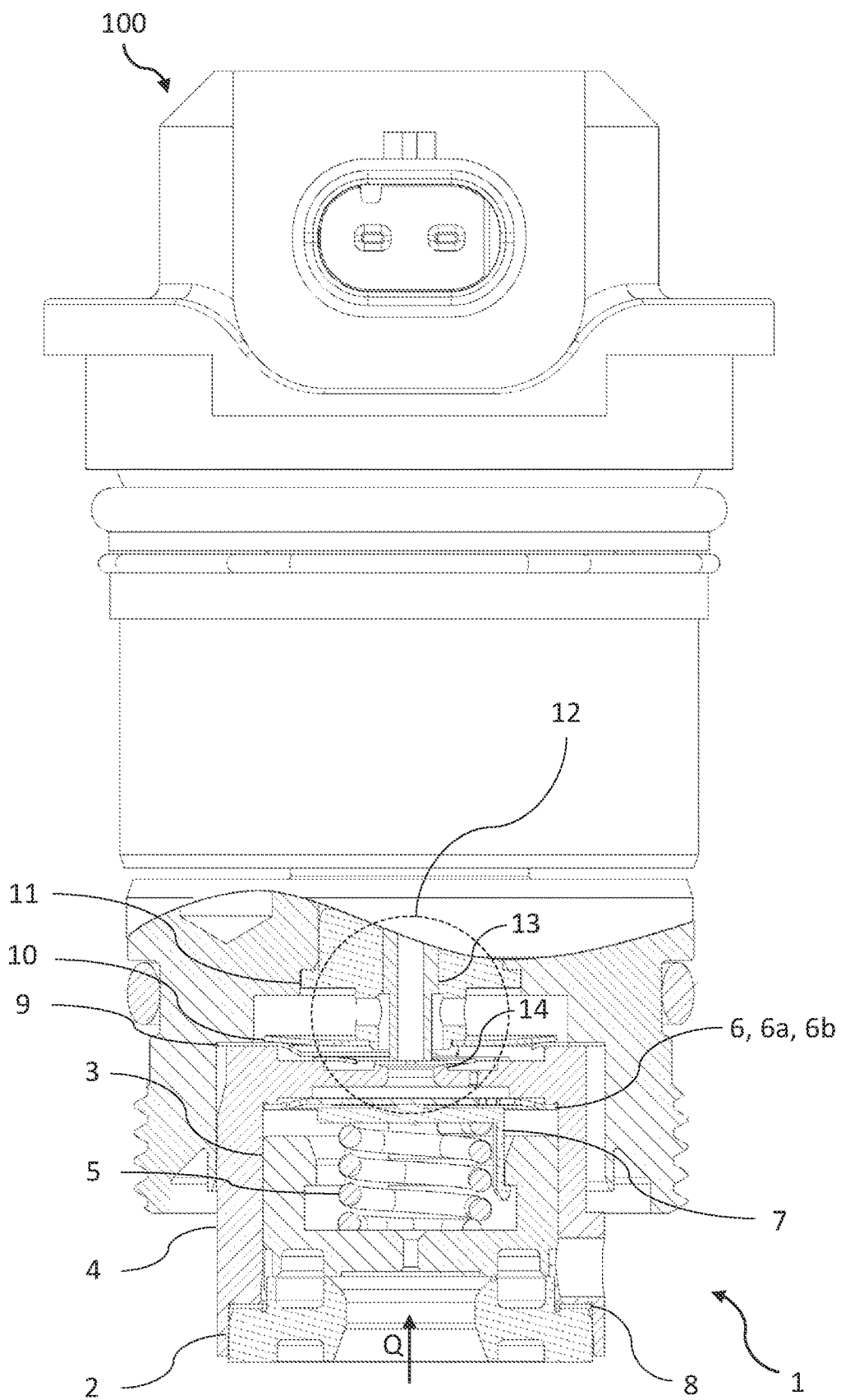
FIG. 1 shows a valve arrangement according to one example of the disclosure when assembled to a solenoid for a shock absorber.

The present disclosure will be described more fully hereinafter with reference to the accompanying drawings, in which preferred examples of the disclosure are shown. This disclosure may, however, be embodied in many different forms and should not be construed as limited to the examples set forth herein; rather, these examples are provided so that this disclosure will be thorough and complete, and will fully convey the scope of the disclosure to those skilled in the art. In the drawings, like numbers refer to like elements.

FIG. 1 shows a valve arrangement 1 according to one example of the disclosure. The valve arrangement 1 is adapted to be arranged in or to a shock absorber 200a, 200b and regulate the damping medium flow between the damping chambers of the shock absorber, often named the compression chamber and the rebound chamber. In FIG. 1, however, everything of the shock absorber 200a, 200b except for a solenoid 100 is omitted from the illustration for the sake of showing the valve arrangement 1 in a more focused manner. See FIGS. 9a, 9b for illustrations of different types of shock absorbers 200a, 200b incorporating said valve arrangement 1 and solenoid 100.

As is shown in FIG. 1, the valve arrangement 1 comprises a valve member 3 axially moveable relative a housing 4. The housing 4 is provided with a generally cylindrical shape into which the valve member 3 is inserted via an opening towards the bottom as can be seen in FIG. 1. The valve member 3 is adapted to move axially in the housing 4 away from a valve seat 2 upon which the valve member 3 rests when in a resting stroke position X0' (see FIG. 4a). When the valve member 3 axially moves relative the housing 4, an opening defined by an interface between the valve member 3 and a valve seat 2 is adjusted. The opening is closed when the valve member 3 rests on the valve seat 2 but open when the valve member 3 is axially displaced therefrom, thereby allowing a damping medium flow to flow through this opening. When the valve member 3 moves away from the valve seat 2 even further, the opening between the two is increased, which allows for an even greater damping medium flow. The valve member 3 is thus adapted to be moveable relative the housing 4 in response to a damping medium flow Q flowing through the valve seat 2 towards the valve member 3. The axial displacement of the valve member 3, i.e. the stroke length, is measured relative a fixed and predetermined reference position X0 of the housing 4 (see e.g. FIG. 4a).

Further, as can be seen in FIG. 1, the valve member 3 is provided with a through hole adapted in size and form so as to allow a certain damping medium flow to pass therethrough. If the damping medium flow is greater than what the through-hole of the valve member is dimensioned for, pressure build-up occurs acting on the valve member 3 causing it to be displaced from the valve seat 2 in an axial direction further into the housing 4. This allows the damping fluid flow to be regulated by the valve arrangement 1.

The valve arrangement 1 further comprises a spring arrangement. The spring arrangement comprises a first spring 6a, a second spring 6b and a coil spring 5. This 'triple spring arrangement' is adapted to counter the axial movement of the valve member 3, biasing it to return towards the valve seat 2 into the resting stroke position. In the example shown in FIG. 1, the first spring 6a and the second spring 6b are provided by deflectable shim spring portions of a single shim spring 6. The coil spring 5 is arranged between the valve member 3 and a coupling member 7. In FIG. 1, the coupling member 7 is a spring cap adapted to couple to an end of the coil spring 5. The spring cap 7 latches into the valve member 3 in a sliding manner so that the coil spring 5 is securely held in place. The latch mechanism is provided by a set of latches 72 arranged on a respective flexible leg, flexible so that the legs flex towards each other, thereby allowing the spring cap 7 to be partially inserted into the valve member 3. When inserted, the legs flex away from each other, which consequently places the latches 72 in position so as to prevent the spring cap to be dislocated from the valve member 3.

In one example, the coil spring 5 is biased when the valve member 3 is in the resting stroke position X0'. How much the coil spring 5 is biased is dependent on the length of the coil spring 5, the depth of the cavity of the valve member 3 into which the coil spring 5 is placed and the length of the legs of the spring cap 7. These parameters can be varied accordingly to achieve a certain damping force characteristic.

Figure 2:
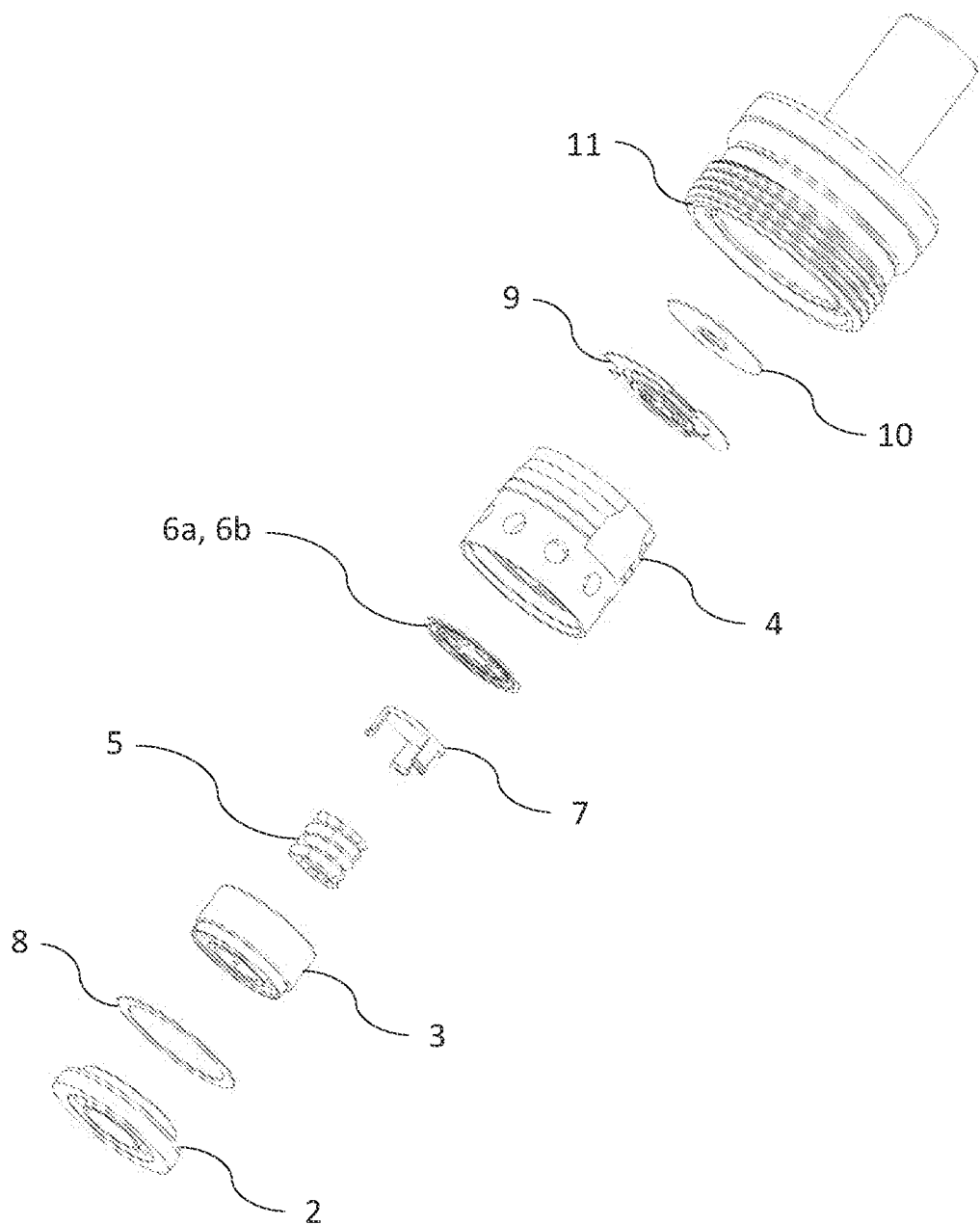
FIG. 2 shows an exploded perspective view of the valve arrangement according to one example of the disclosure.
Figure 3:
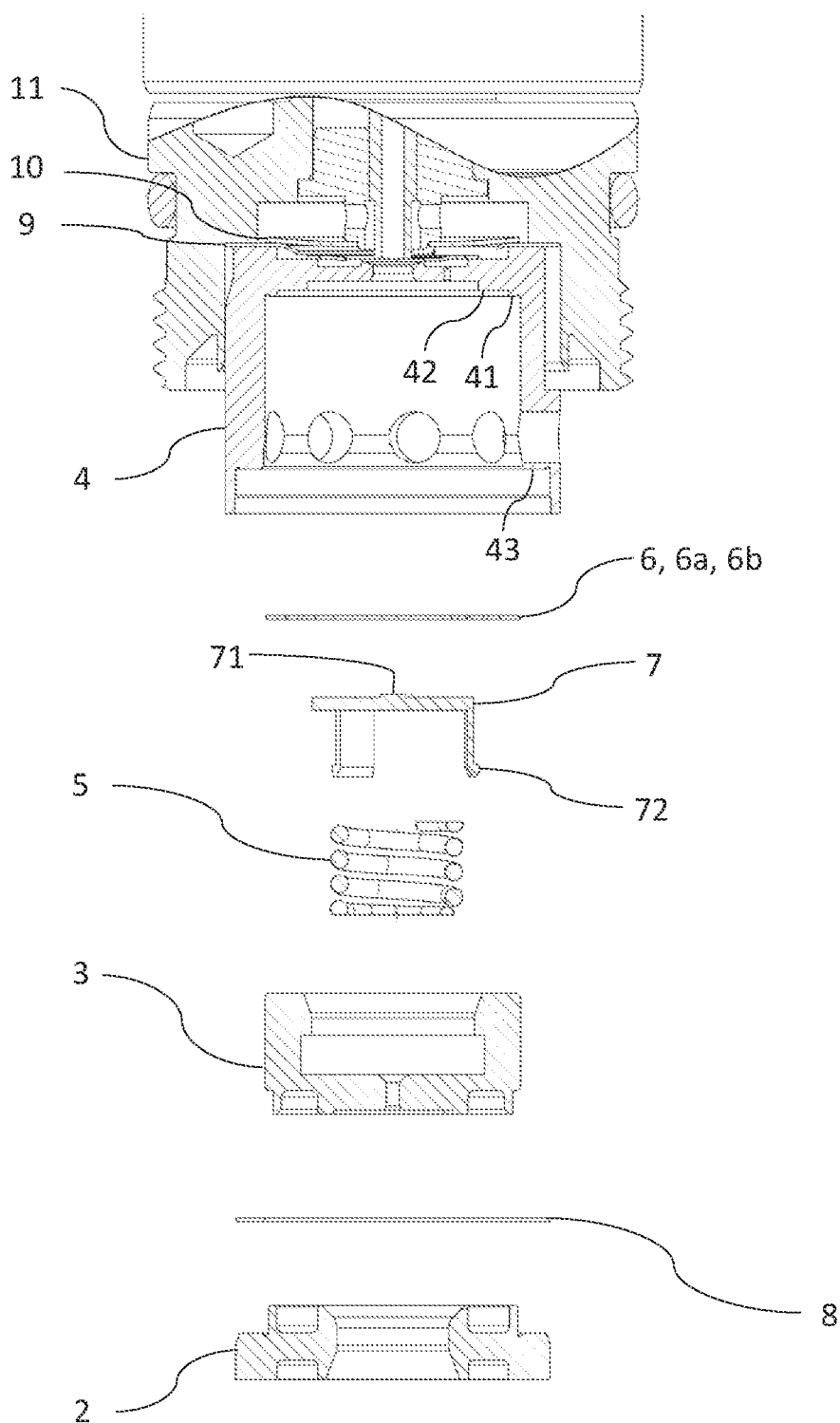
FIG. 3 shows an exploded side view of the valve arrangement according to one example of the disclosure.

Each of the components of the valve arrangement 1 can be seen, according to some examples, in FIGS. 2 and 3. As can be seen here, the spring cap 7 is arranged so that it comes into contact with the shim spring 6. Further, the spring cap 7 is provided with a protrusion 71 extending in an axial direction. The purpose of this protrusion is to engage with an innermost shim spring portion 62 of the shim spring 6. The first and second springs 6a, 6b are coupled to each other and the protrusion 71 of the spring cap 7 enables a smaller interaction area which facilitates the shim spring 6 to deform as intended.

According to one example, it is desirable to have the first spring 6a in a biased condition when the valve member 3 is in the resting stroke position X0'. The biasing of the first spring 6a is adjusted to press onto the shim spring 6 so that the first spring 6a deflects first and the second spring 6b deflects thereafter as the stroke length increases. The valve arrangement 1 allows for the insertion of one or more adjustment shims 8 between the valve seat 2 and the housing 4. This allows for adjusting an offset distance between the valve seat 2 and the housing 4 and consequently the resting stroke position of the valve member 3.

Figure 4A:
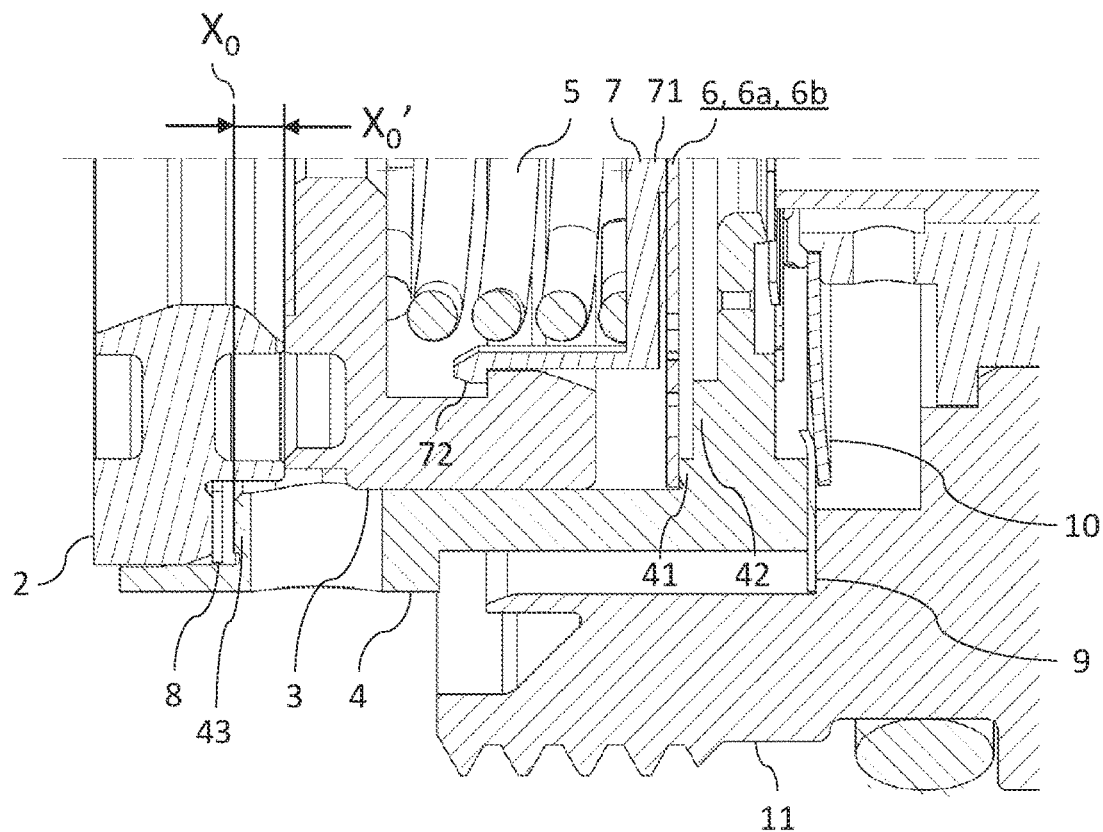
FIGS. 4a-4d show cross sectional views of the valve arrangement according to one example of the disclosure.

FIG. 4a shows a cross-sectional view as the valve seat 2 is being arranged into the housing 4, something which is indicated by the gap present between the adjustment shim 8 and the fixed portion 43 of the housing 4. When correctly assembled, there will be no gap between the valve seat 2 and the housing 4, or any gap between the valve seat 2, the housing 4 and any adjustment shims placed therebetween. Further, by inserting an adjustment shim 8 of a preferred thickness, the relative position of the valve seat 2 relative the housing 4 may be adjusted. This consequently adjusts the resting stroke position X0' of the valve member 3 in the housing 4. If not inserting any adjustment shim 8, the valve seat 2 and the housing 4 may abut each other, which consequently places the resting stroke position of the valve member 3 further unto the housing 4. Assuming the dimensions of the valve member 3 and the spring arrangement have not been altered, then the further the resting stroke position of the valve member 3 is positioned in the housing 4, the more the first spring 6a is biased. The opposite is true as well, the thicker the adjustment shim, or the more adjustment shims are incorporated, then the resting stroke position of the valve member 3 is positioned towards an outward direction of the housing 4. This consequently reduces how much the first spring 6b is biased when the valve member 3 is in the resting stroke position. Thus, there can be a case wherein the first spring is not biased at all when the valve member 3 is in the resting stroke position.

As can be understood from FIG. 4a, the example shown is provided with the first spring 6b being biased when the valve member 3 is in the resting stroke position—this can be understood as the shim spring 6 is in a fully undeflected state but the valve seat 2 is not yet fully inserted into the housing 4.

Figure 4B:
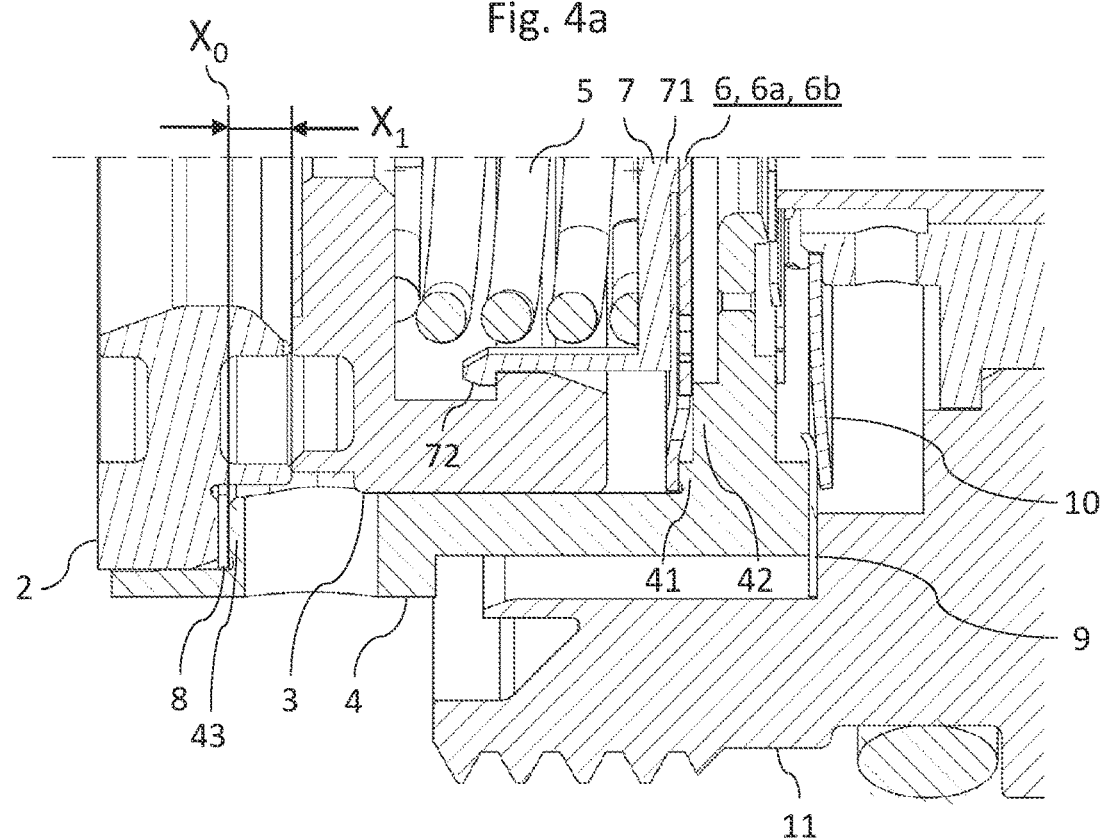

When arranged in a shock absorber, a damping medium flow between the damping chambers of the shock absorber is regulated by the force equilibrium of the valve member 3. The force equilibrium is partially or mainly created by a damping medium which is dependent on the damping medium flow and acts upon the valve member 3 counter to the action of the spring arrangement. Thus, when the damping medium acts on the valve member 3 and is unable to flow through the valve members through-opening to the degree necessary, the pressure increases and the valve member 3 is forced away from the valve seat 2. In response to this movement, the first spring 6a deflects so that a deflectable spring portion of the shim spring moves toward a fixed portion 42 of the housing 4. Due to the coil spring being biased by the spring cap 7, it does not compress further until the first and second spring has deflected first. When the stroke length X1 is reached, as measured from a predetermined reference position X0 of the housing 4, a deflectable spring portion abuts the fixed portion 42 which prevents the first spring 6a from deflect more. This is shown in FIG. 4b.

Figure 4C:
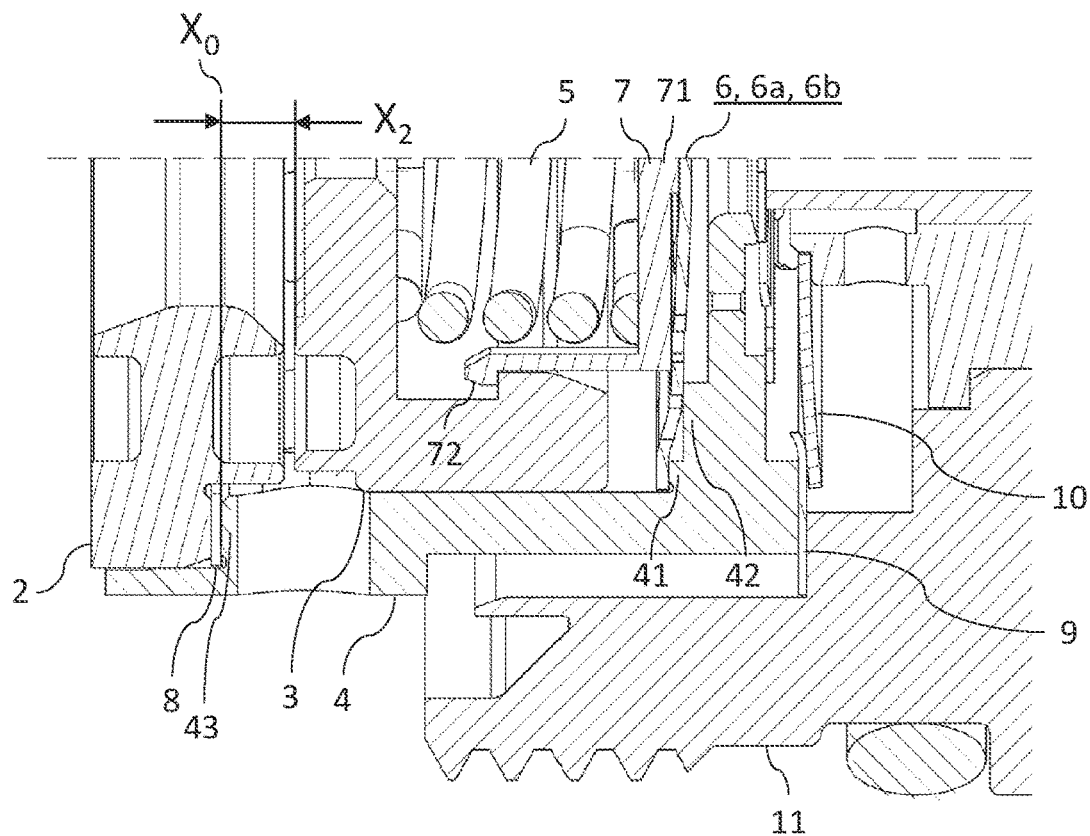
Figure 4D:
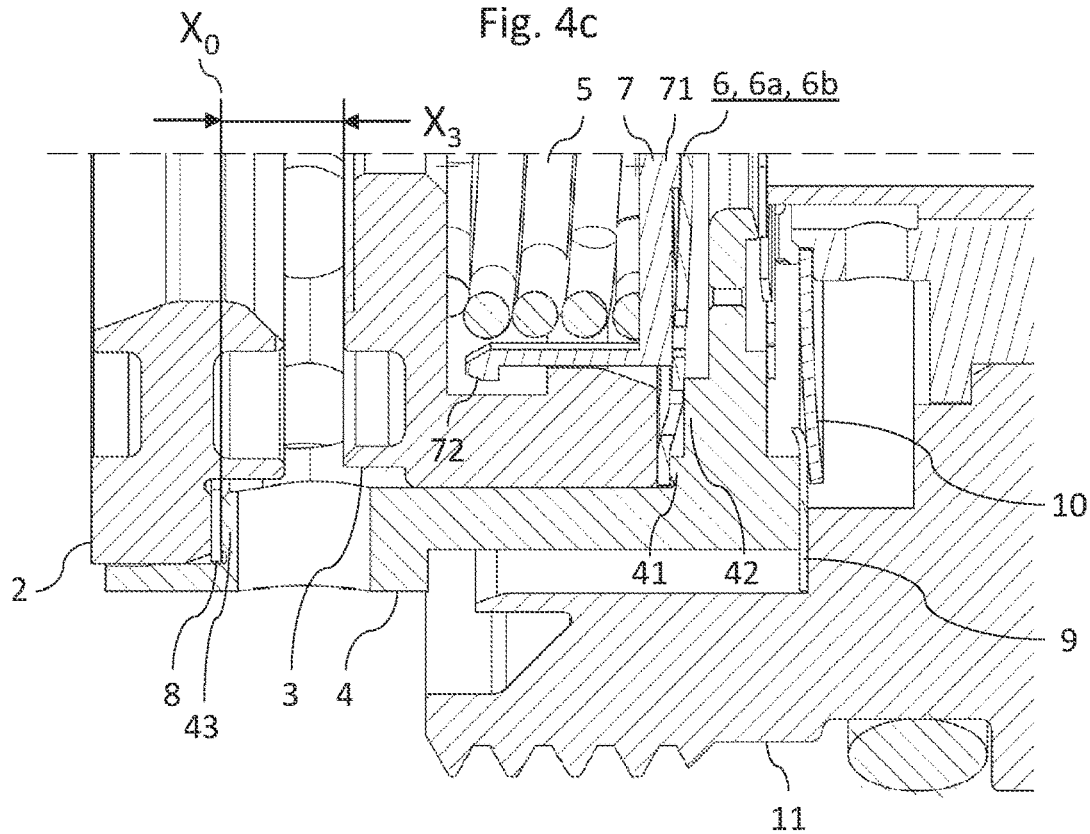

When the valve member 3 moves beyond the stroke length X1, the second spring 6b starts to deflect. How much the second spring 6b can deflect is dependent on how far the protrusion of the spring cap 7 protrudes out of the main body of the spring cap 7. The second spring 6b is prevented from deflecting further once the main body of the spring cap 7 abuts the shim spring 6 as shown in FIG. 4c. Once this happens, which occurs at the second stroke length X2, the coil spring 5 will start to compress up to a maximum stroke length X3 at which case the valve member 3 abuts an outer rim of the shim spring as shown in FIG. 4d.

Figure 5:
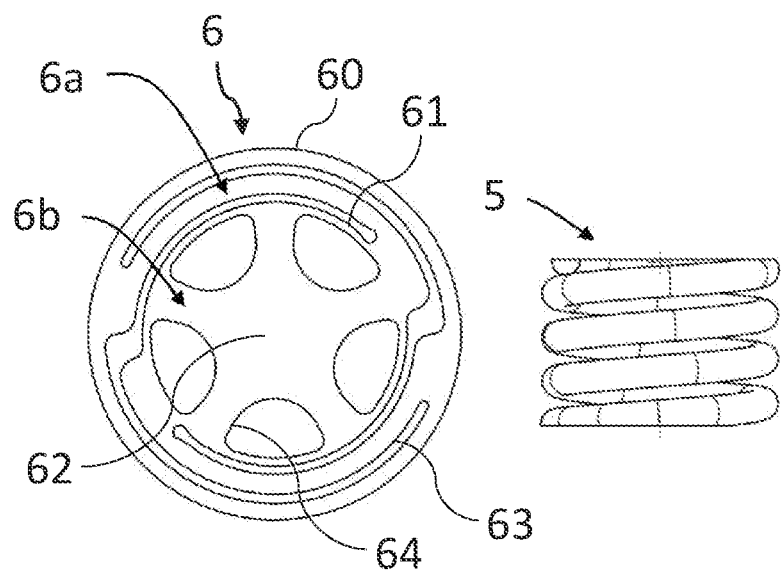
FIG. 5 shows the springs of the spring arrangement according to one example of the disclosure.

FIG. 5 shows the shim spring 6 in greater detail and the coil spring 5. The shim spring 6 is shaped in size and form to provide the first and second spring 6a, 6b. The first spring 6a is provided by an outer shim spring portion 60 forming the outer rim of the shim spring 6 and an inner shim spring portion 61 separated from the outer shim spring portion 60 and connected thereto via flexible legs 63 so that the outer shim spring portion 60 and the inner shim spring portion 61 can deflect in relation to each other. The outer shim spring portion 60 and the inner shim spring portion 61 can deflect in relation to each other by a first deflection distance corresponding to the first stroke length X1. The second spring 6b is provided by the inner shim spring portion 61 and an innermost shim spring portion 62 separated from the inner shim spring portion 61 but connected thereto via flexible legs 64 so that the inner shim spring portion 61 and the innermost shim spring portion 62 can deflect in relation to each other. The inner shim spring portion 61 and the innermost shim spring portion 62 can deflect in relation to each other by a second deflection distance corresponding to the second stroke length X2.

Further, in FIG. 5, the flexible legs 64 connecting the innermost shim spring portion 62 to the inner shim spring portion 61 are shown to extend in a radial direction from a center of the shim spring 6. However, the flexible legs 64 may alternatively extend in a circumferential manner. The flexible legs 64 are five in total and arranged symmetrically between the innermost shim spring portion 62 and the inner shim spring portion 61. The flexible legs 63 connecting the inner shim spring portion 61 with the outer shim spring portion 60 extend in a circumferential direction of the shim spring 6. The flexible legs 63 are two in total and symmetrically placed between the inner shim spring portion 61 and the outer shim spring portion 60.

Figure 6:
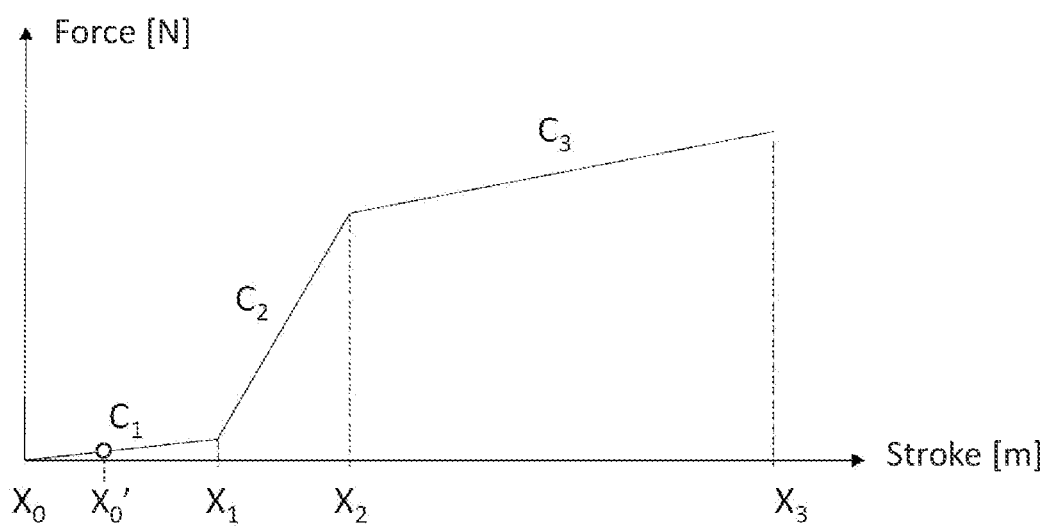
FIG. 6 shows a damping force characteristic enabled by the valve arrangement according to one example of the disclosure.

The damping force characteristic achieved by the present disclosure is shown in FIG. 6 where magnitude of the force is shown along the vertical axis and the stroke length is shown along the horizontal axis. The damping force characteristic is characterized by: a first damping force region wherein the damping force increases slowly between the predetermine reference position X0 and the first stroke length X1; a second damping force region wherein the damping force increases more rapidly between the first stroke length X1 and the second stroke length X2; and a third damping force region wherein the damping force increases slowly with increasing stroke length in an interval between the second stroke length X2 and a third stroke length X3. During the first damping force region, the first spring 6a deflects. During the second damping force region, the second spring 6b deflects. During the third damping force region, the coil spring 5 compresses.

FIG. 1 also depicts a pilot valve 12 which is fluidly connected with the valve arrangement 1. The pilot valve 12 comprises a shim spring 9, a pilot valve seat 14 and a pilot valve body 11. In the example shown in FIG. 1, the pilot valve seat 14 is formed as an integral part of the valve housing 4. It may alternatively be formed as a separate part therefrom but fixedly attached thereto. The shim spring 9 comprises an outer shim spring portion and an innermost shim spring portion connected via flexible legs to the outer shim spring portion, either directly or via an intermediate inner shim spring portion which connects to the outer shim spring portion via flexible legs. By this, the shim spring 9 is adapted to move partially between a first position where the innermost shim spring portion interacts with the valve seat 14 to regulate the damping medium flow flowing through the pilot valve seat 14, and a second position away from the pilot valve seat 14. The outer shim spring portion of the shim spring 9 is substantially fixed relative the pilot valve seat 14 but offset therefrom. Thus, the innermost shim spring portion is biased to move in a direction towards the second position when interacting with the valve seat 14 in the first position or when at least displaced from the second position. The position of the innermost shim spring portion is controlled by means of a solenoid device 100 configured to generate a solenoid force acting on the innermost shim spring portion via an actuation member 13 which is axially displaceable relative a pilot valve body 11 to interact with the innermost shim spring portion. Further, the pilot valve body 11 is shaped in size and form to define a cavity extending in an axial direction in which the actuation member 13 is moveable.

The pilot valve body 11 also defines one or more pilot valve body channels which extend from an opening facing the pilot valve seat 14 and a respective auxiliary opening which opens to the surroundings of the pilot valve body 11. In FIG. 1, two such auxiliary openings are shown. The one or more pilot valve body channels are further at least partly defined by a gap between the actuation member 13 and the pilot valve body 11. As shown in FIG. 1, the actuation member 13 is narrower than the through-opening of the pilot valve body 11, resulting in said gap formed.

Figure 7:
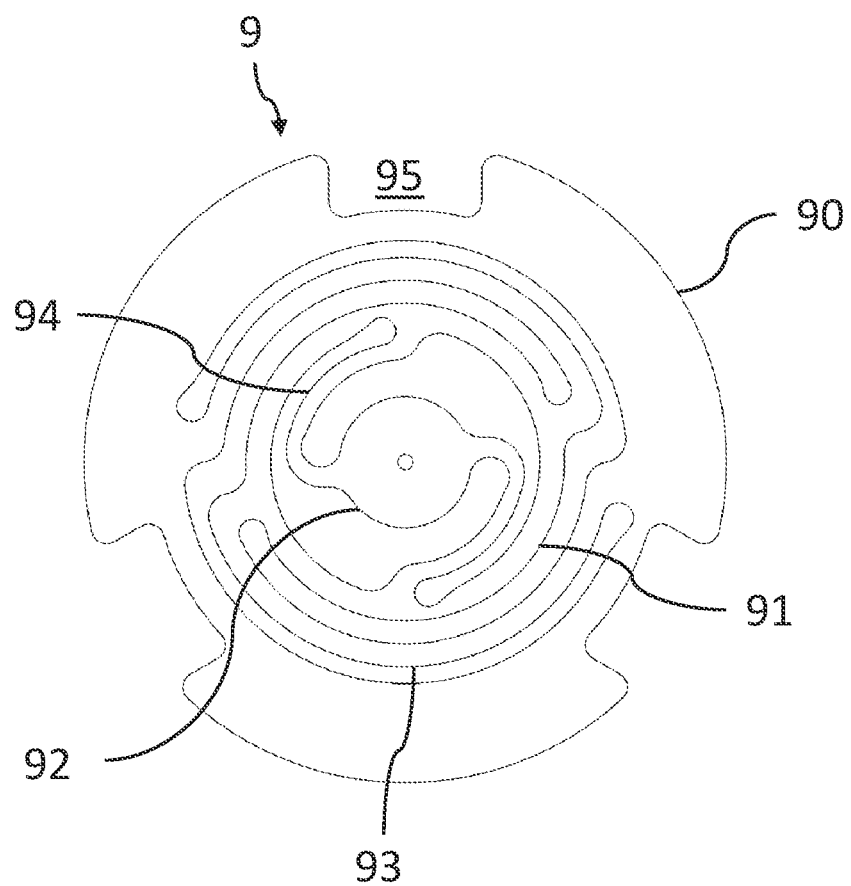
FIG. 7 shows a spring according to one example of the disclosure.
Figure 8A:
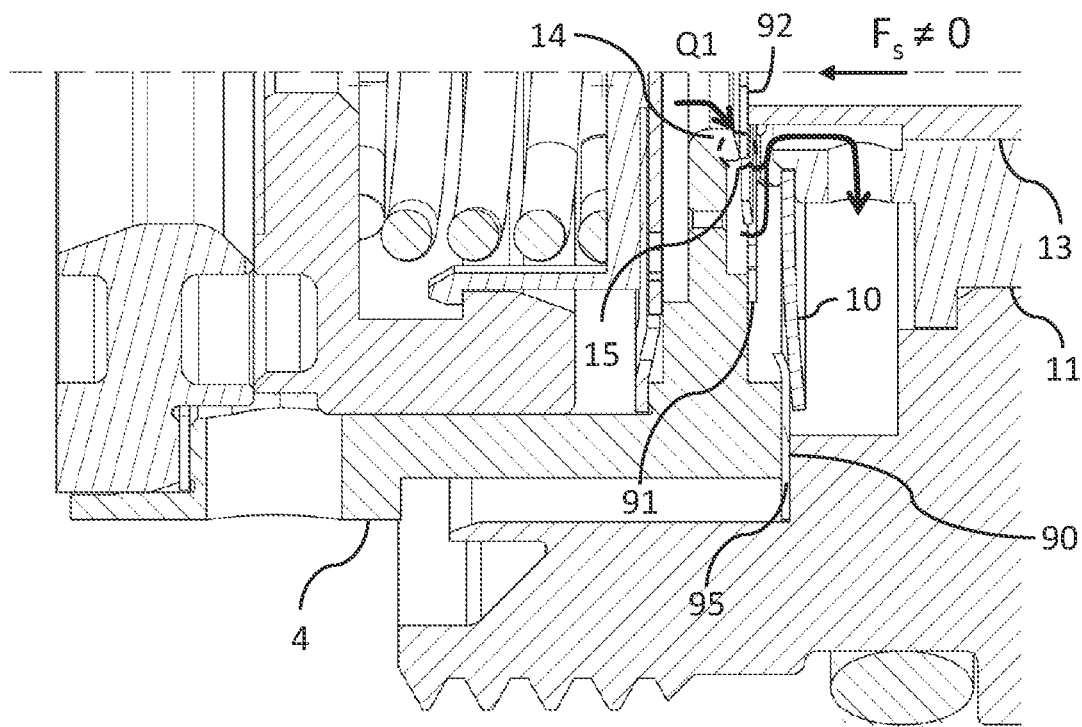
FIGS. 8a and 8b show a cross sectional view of the valve arrangement and a pilot valve with fail-safe operation according to one example of the disclosure.

The shim spring 9 may have a shape as illustrated in FIG. 7. The shim spring 9 shown in FIG. 7 comprises a first shim spring portion 90, also herein referenced as outer shim spring portion, corresponding to the outer rim of the shim spring. It further comprises a second shim spring portion 91 corresponding to an inner portion of the shim spring. The shim spring 9 further comprises a third shim spring portion 92, also herein referenced as an innermost shim spring portion, corresponding to an innermost portion of the shim spring. The first and second shim spring portions 90, 91 are interconnected via flexible legs 93 enabling the first and second shim spring portions 90, 91 to deflect relative each other, thereby defining a first shim spring. The flexible legs 93 extend in a circumferential direction. The second and third shim spring portions 91, 92 are interconnected via flexible legs 94 enabling the second and third shim spring portions 91, 92 to deflect relative each other, thereby defining a second shim spring. The flexible legs 94 also extend in a circumferential direction The pilot shim spring 9 may also be adapted in shape and size to provide one or more openings 95 proximate the outer diameter of the shim spring, as seen in FIG. 7. The one or more openings may be three as illustrated in FIG. 7 but may be two, four or more. Said one or more openings 95 enable fluid communication through the pilot shim spring 9 between the surroundings of the pilot valve body 11 and the valve housing 4 as shown in FIG. 8*a*. Damping medium flow may flow through these one or more openings, via a main port in the pilot valve seat and/or auxiliary valve ports in the pilot valve seat.

Figure 8B:
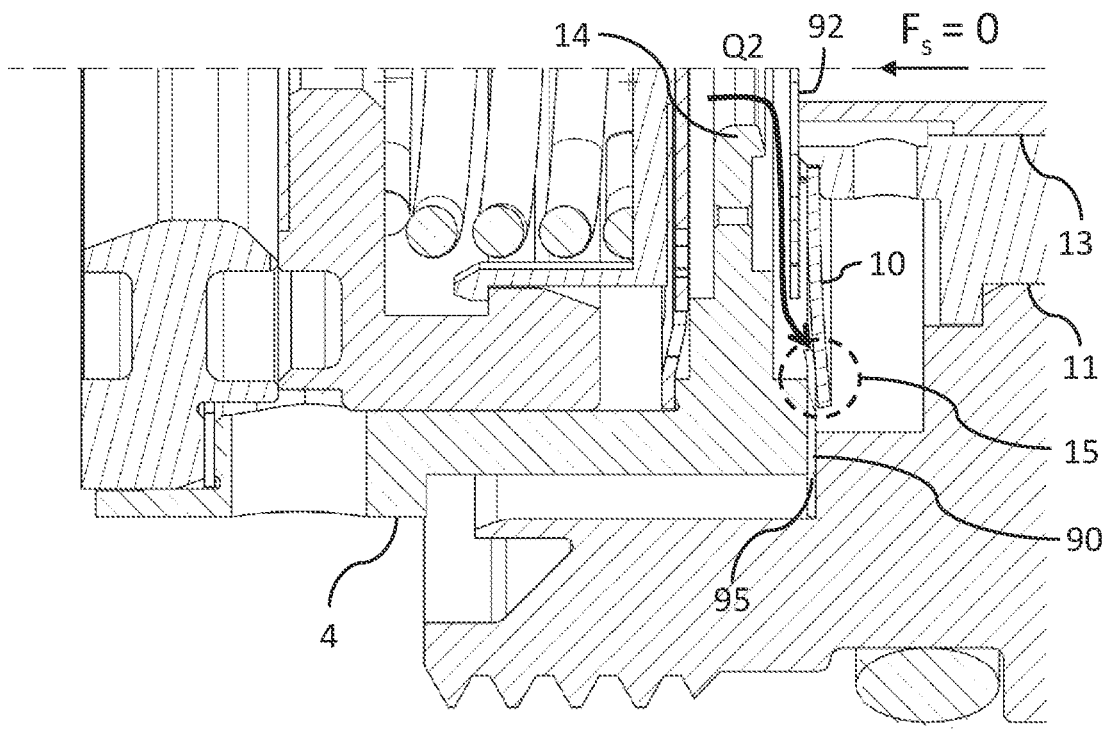

The pilot valve 12 may also be adapted with fail-safe operation in case the solenoid device fails to generate the solenoid force acting on the shim spring 9. The fail-safe operation may be enabled by the pilot valve 12 defining a first damping medium flow path Q1 along which the shim spring 9 regulates the damping medium flow and a second damping medium flow path Q2 wherein a fail-safe shim 10 regulates the damping medium flow. FIGS. 8*a* and 8*b* illustrate these and also the fail-safe operation in more detail.

In FIG. 8*a*, the pilot valve operates normally, meaning the solenoid force Fs acts on the shim spring 9 causing the innermost shim spring portion 92 to be pushed toward the valve seat 14. Thus, the damping medium flow is regulated at the interface 15 between the valve seat 14 and the innermost shim spring portion 92. The first damping medium flow path continues from this regulation interface 15 into a pilot valve body channel formed in the pilot valve body 11, along a gap between the actuation member 13 and an interior face of the pilot valve body 11 and then through an auxiliary opening which opens into a surrounding of the pilot valve body 11. This first damping medium flow path is indicated in FIG. 8*a* by arrows. When the shim spring 9 is in this state, it is biased to return to a less flexed position, meaning it will move away from the pilot valve seat 14 if not for the solenoid force Fs acting on the shim spring 9.

However, when the solenoid device 100 stops generating the solenoid force Fs acting on the innermost shim spring portion 92, either intentionally or unexpectedly, the innermost shim spring portion 92 will move away from the valve seat 14 into a second position where it blocks the first damping medium flow path Q1 by covering the pilot valve body channel opening in the pilot valve body 11. In this state, the damping medium flow is forced to flow along a second damping medium flow path Q2 as shown in FIG. 8*b* wherein the fail-safe shim regulates the damping medium flow. In particular, the regulation occurs at an interface 16 formed between the fail-safe shim and the shim spring 9.

By this, the pilot valve 12 may provide damping medium flow regulation even if the solenoid device stops generating the solenoid force Fs.

Figure 9A:
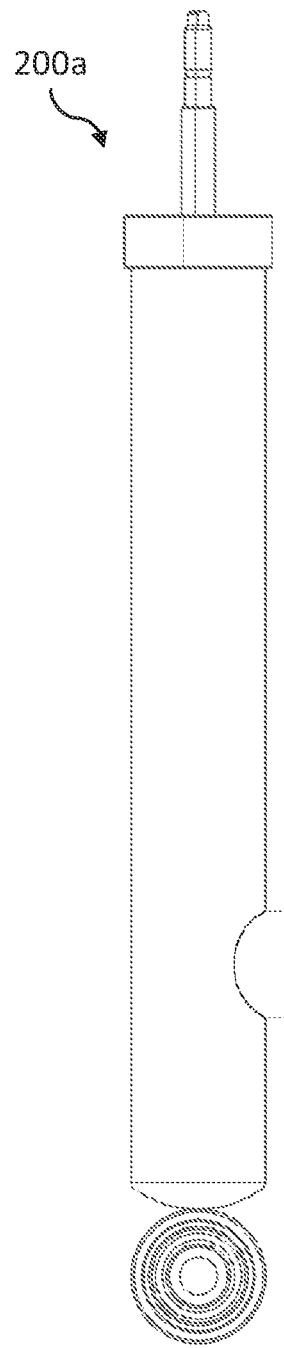
FIGS. 9a and 9b each show a shock absorber according to one example of the disclosure.
Figure 9B:
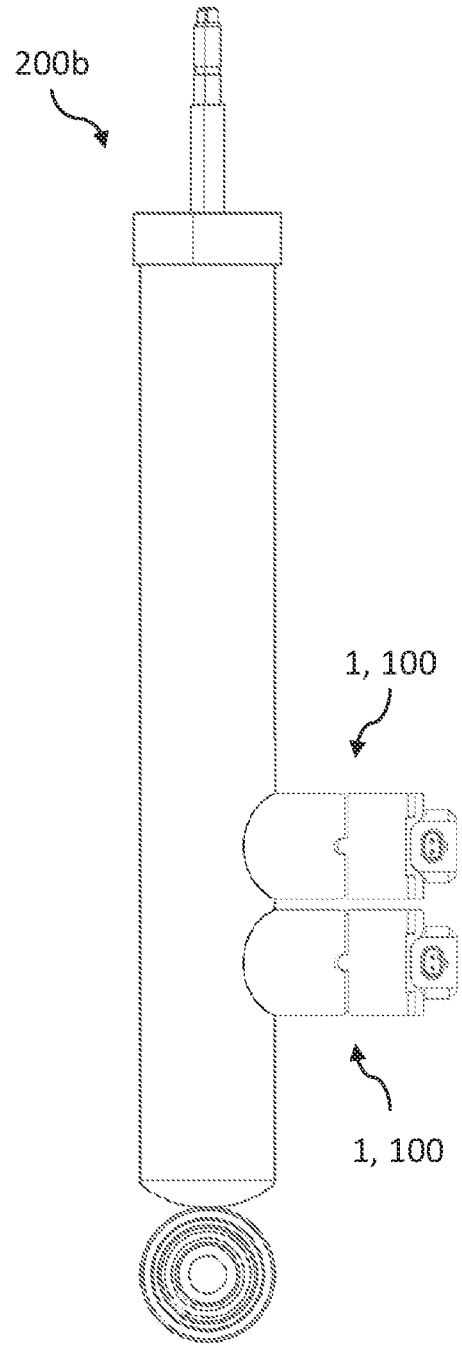

FIGS. 9*a*, 9*b* show shock absorbers according to different examples of the disclosure. FIG. 9*a* shows a shock absorber 200*a* of a triple cylinder design comprising a valve arrangement 1 and a solenoid device 100. In this design, the valve arrangement 1 regulates the damping medium flow in both rebound and compression strokes. FIG. 9*b* shows a shock absorber 200*b* of a double cylinder design comprising a first and second valve arrangement 1 and a respective solenoid device 100. In this design, one of the two valve arrangements regulate the damping medium flow during rebound strokes while the other of the two valve arrangements regulate the damping medium flow during compression strokes.

Figure 10:
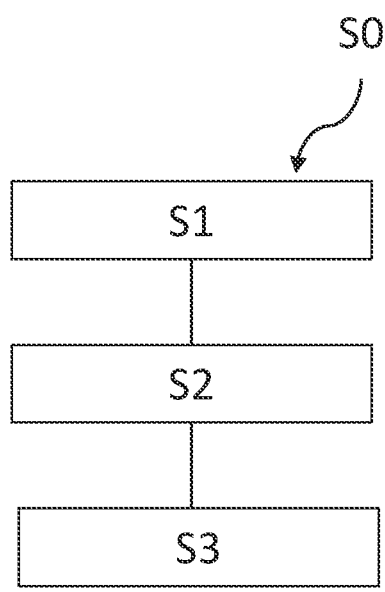
FIG. 10 shows a flow chart of a method according to one example of the disclosure.

FIG. 10 shows a flow chart of a method according to one example of the disclosure. The method S0 pertains to method for controlling a damping medium flow between damping chambers of a shock absorber by means of a valve arrangement 1. The valve arrangement 1 comprises a valve member 3 axially moveable relative the housing 4 by which movement an opening defined by an interface between the valve member 3 and a valve seat 2 is adjusted. The valve arrangement 1 used by the method comprises a spring arrangement comprising a first spring 6*a*, a second spring 6*b* and a coil spring 5 arranged between the valve member 3 and a coupling member 7 coupled to the first spring 6*a* and the second spring 6*b*. The damping medium flow between the damping chambers of the shock absorber is regulated by the force equilibrium of the valve member 3, which force equilibrium is partially or mainly created by a damping medium pressure which is dependent on the damping medium flow and acts upon the valve member 3 counter to the action of the spring arrangement. The method comprises the steps of, when the valve member 3 moves no more than a first stroke length X1 relative a predetermined reference position X0, adjusting S1 said force equilibrium by deflecting the first spring 6*a*; when the valve member 3 moves more than the first stroke length X1, adjusting S2 said force equilibrium by deflecting the second spring 6*b*, and when the valve member 3 moves beyond a second stroke length X2 greater than the first stroke length X1, adjusting S3 said force equilibrium by compressing the coil spring 5.

In the drawings and specification, there have been disclosed examples of the disclosure and, although specific terms are employed, they are used in a generic and descriptive sense only and not for the purpose of limitation, the scope of the invention being set forth in the following claims.

The invention claimed is:

1. A valve arrangement for a shock absorber, comprising:
a valve member axially moveable relative a housing by which movement an opening defined by an interface between the valve member and a valve seat is adjusted;
a spring arrangement comprising a first spring, a second spring and a coil spring, wherein the coil spring is arranged between the valve member and a coupling member, and wherein the coupling member is coupled to the first spring and the second spring;
wherein the valve arrangement is adapted so that, when arranged in a shock absorber, a damping medium flow between damping chambers of the shock absorber is regulated by the force equilibrium of the valve member, which force equilibrium is partially or mainly created by a damping medium pressure which is dependent on the damping medium flow and acts upon the valve member counter to the action of the spring arrangement;
wherein the second spring has a higher spring constant than the first spring and the coil spring; and
when the valve member moves no more than a first stroke length relative a predetermined reference position the first spring deflects to adjust said force equilibrium, when the valve member moves more than the first stroke length the second spring deflects to adjust said force equilibrium, and when the valve member moves beyond a second stroke length greater than the first stroke length, the coil spring compresses to adjust said force equilibrium.

2. The valve arrangement according to claim 1, wherein the coil spring is biased when the valve member is at a resting stroke position relative the predetermined reference position.

3. The valve arrangement according to claim 1, wherein the coupling member is a spring cap adapted with latches for maintaining the biasing of the coil spring while allowing the coil spring to be compressed in a controlled manner.

4. The valve arrangement according to claim 1, wherein a predetermined resting stroke position is adjustable by inserting an adjustment shim of a specific thickness between the valve seat and the valve housing.

5. The valve arrangement according to claim 1, wherein both the first spring and the second spring are provided by deflectable shim spring portions of a single shim spring.

6. The valve arrangement according to claim 5, wherein the first spring is provided by an outer shim spring portion forming the outer rim of the shim spring, and an inner shim spring portion separated from the outer shim spring portion and connected thereto via flexible legs, so that the outer shim spring portion and the inner shim spring portion can deflect in relation to each other by a first deflection distance corresponding to the first stroke length, and wherein the second spring is provided by the inner shim spring portion and an innermost shim spring portion separated from the inner shim spring portion but connected thereto via flexible legs, so that the inner shim spring portion and the innermost shim spring portion can deflect in relation to each other by a second deflection distance corresponding to the second stroke length.

7. The valve arrangement according to claim 6, wherein the coupling member is a spring cap comprising a protrusion adapted to press onto the innermost shim spring portion.

8. The valve arrangement according to claim 6, wherein the deflection distance between the outer shim spring portion and the inner shim spring portion is created by the first spring ($6a$) being biased between a first fixed part in the valve housing and the coupling member.

9. The valve arrangement according to claim 8, wherein the deflection distance between the inner shim spring portion and the innermost shim spring portion is created by the second spring being biased between a second fixed part in the valve housing and the coil spring.

10. The valve arrangement according to claim 6, wherein the legs connecting the innermost shim spring portion to the inner shim spring portion extend in a direction from a center of the shim spring.

11. The valve arrangement according to claim 6, wherein the legs connecting the inner shim spring portion with the outer shim spring portion extend in a circumferential direction of the shim spring.

12. The valve arrangement according to claim 1, adapted to operate under the influence of a pilot valve controlled by a solenoid device.

13. A shock absorber comprising a valve arrangement according to claim 1.

14. A method for controlling a damping medium flow between damping chambers of a shock absorber by means of a valve arrangement comprising a valve member axially moveable relative a housing, wherein movement of the valve member adjusts an opening defined by an interface between the valve member and a valve seat, and by means of a spring arrangement comprising a first spring, a second spring and a coil spring arranged between the valve member and a coupling member coupled to the first spring and the second spring, wherein the second spring has a higher spring constant than the first spring and the coil spring, wherein a damping medium flow between the damping chambers of the shock absorber is regulated by the force equilibrium of the valve member, which force equilibrium is partially or mainly created by a damping medium pressure which is dependent on the damping medium flow and acts upon the valve member counter to the action of the spring arrangement, the method comprising the steps of:
when the valve member moves no more than a first stroke length relative a predetermined reference position, adjusting said force equilibrium by deflecting the first spring;
when the valve member moves more than the first stroke length, adjusting said force equilibrium by deflecting the second spring; and
when the valve member moves beyond a second stroke length greater than the first stroke length, adjusting said force equilibrium by compressing the coil spring.

* * * * *